United States Patent [19]

Kobayashi

[11] Patent Number: 4,598,977
[45] Date of Patent: Jul. 8, 1986

[54] BI-LEVEL PHASE GRATING FOCUSING PLATE

[75] Inventor: Hiroshi Kobayashi, Osaka, Japan

[73] Assignee: Minolta Camera Kabushiki Kaisha, Osaka, Japan

[21] Appl. No.: 296,136

[22] Filed: Aug. 25, 1981

[30] Foreign Application Priority Data

Aug. 26, 1980 [JP] Japan ................................ 55-117925

[51] Int. Cl.$^4$ ......................... G02B 5/18; G02B 27/10
[52] U.S. Cl. .................................. 350/162.2; 350/169
[58] Field of Search ........... 350/162.16, 162.2, 162.11, 350/167, 169

[56] References Cited

U.S. PATENT DOCUMENTS 3,547,546 12/1970 Schier .............................. 350/162.16

FOREIGN PATENT DOCUMENTS 2946005 5/1980 Fed. Rep. of Germany .
53-31127 3/1978 Japan .
55-9568 1/1980 Japan .

Primary Examiner—Bruce Y. Arnold
Attorney, Agent, or Firm—Price, Gess & Ubell

[57] ABSTRACT

An improved phase grating focusing plate has, formed on a base surface thereof, a number of fine unit patterns, each of which has a plurality of projections and/or recessions or a plurality of sets of alternatively arranged ring-shaped concentric projections and recessions in a spaced and symmetrical configuration. The ratio $\gamma$ of the sum of the areas of the projections or recessions to the overall area of the unit pattern is determined to be $0.25 \leq \gamma < 0.5$ for light having a wavelength ranging from 0.46 $\mu$m to 0.64 $\mu$m, and the phase difference $\theta$ of the light due to the level difference between the projections or the recessions and the surface of the focusing plate is determined to be $\pi$.

19 Claims, 18 Drawing Figures

BI-LEVEL PHASE GRATING FOCUSING PLATE

BACKGROUND OF THE INVENTION

1. Field of the Invention

This invention relates to an improved phase grating focusing plate which has a number of fine unit patterns consisting of projections and/or recessions on a surface of a substrate such that the unit patterns are arranged regularly in a regular square configuration or in a regular triangle configuration.

2. Description of the Prior Art

Viewfinders in various types of cameras have utilized diffraction grating plates to permit focusing. Generally, a centralized image pattern is progressively brought into focus by adjustment of the objective lens system. When the focal point is coincident with the diffraction plate, the image appears clearly in the viewfinder.

Several problems commonly occur in the focusing of optical instruments, such as cameras. For example, in observing the image focused on a focusing plate via an optical focusing system, the wider the angle of diffusion on the focusing plate, the easier it is for the operator to visualize the defocused state and to bring the image into focus. The increased angle, however, diminishes the quantity of light striking the operator's eye and the brightness of the visual field of the viewfinder. On the contrary, the smaller the angle of diffusion on the focusing plate, the brighter the visual field but the more difficult it is to focus an image. In other words, the ease of focusing and the brightness of the visual field are conflicting conditions.

A conventional focusing plate consisting of a ground glass plate generally exhibits the characteristics that the intensity of diffusion light is high at the angle of diffusion of 0° (optical axis) and decreases suddenly with any increase in the angle of diffusion. As a result, it can be observed that a defocused image from a point source is very sharp at its center and degrades gradually away from its center, with resulting difficulties in focusing. Secondly, in the case of projections and recessions irregularly distributed on the glass substrate with slanted upper surfaces forming an acute angle with respect to the optical axis, refracted light from these slanted surfaces moves away from the operator's eye so that grain-shaped black spots are observed by the operator's eye and the overall image quality of the viewfinder screen deteriorates.

Many focusing plates of a phase grating type have been suggested, such as set forth in Japanese Patent Laid-Open Publications No. 47/27531, 52/154629, 52/145221, 53/31127, 55/9568 and German Patent Laid-Open Publication No. 2,946,005.

According to Laid-Open Publication No. 52/154629, a space filter with a specific phase difference $\pi$ is used such that "0"th diffraction light is extremely faint and "±1"th diffraction efficiency is at most 40%. In this case, the use of a diffraction grating renders it difficult to focus on objects in any direction other than a specific one because of its limited directionality. The focusing plates disclosed in Laid-Open Publications No. 47/27531 and 42/145221 also suffer from the above-described disadvantages.

In contrast, a phase grating type focusing plate disclosed in Publication No. 53/31127 is universal and has two-dimensional light diffusion characteristics. However, there is not any teaching as to particular kinds of light diffusion characteristics that are best to facilitate focusing.

With respect to Japanese Patent Laid-Open Publications Nos. 55/9568 and 53/31127 and German Patent Laid-Open Publication No. 2,946,005, each unit pattern of these known focusing plates is provided with either a single central cylindrical projection or a recession or a single set of alternatively arranged ring-shaped concentric projections and recessions. The known focusing plates having such unit patterns suffer from a disadvantage in that freedom or flexibility of design for obtaining desired diffraction characteristics is poor, although it is possible to modulate diffraction characteristics by changing the level difference between the projections and the recessions (i.e., the phase difference $\theta$ of a light due to the level difference), and by changing the radius of the cylindrical projection or recession or the combination of the radii of the ring-shaped concentric projections and recessions (i.e., the ratio $\gamma$ of the total areas of the projections or recessions to the overall area of the unit pattern). In addition, it is another disadvantage of the known focusing plates that even the slightest error in the radius of the cylindrical projection or recession or in the combination of the radii of the ring-shaped concentric projections and recessions, which may occur upon production, affects the diffraction characteristics to considerable extent.

It is to be noted that focusing plates of the described type having unit patterns of different configurations are schematically illustrated in FIGS. 4 and 7 of Japanese Laid Open Publication No. 55/9568. Each of these unit patterns is provided with asymmetrically arranged cylindrical or rectangular parallelopiped projections. The asymmetrical arrangement of such projections in the unit patterns, however, cannot provide defocused images with natural gradation. Accordingly, there is a need in the prior art to provide an optimized focusing plate that provides a bright visual field with improved focusing capabilities while increasing the tolerance of manufacturing errors.

SUMMARY OF THE INVENTION

It is, therefore, an object of the present invention to provide a bi-level phase grating type focusing plate capable of centering a considerable quantity of light in a defocus state within a relatively wide range of diffusion angles, and exhibiting a two-dimensional light diffusion performance, thereby making a visual field bright and facilitating focusing on a desired object.

It is another object of the present invention to provide a bi-level phase grating type focusing plate capable of distributing substantially uniformly relatively bright spot images in a defocus state within a relatively wide range of diffusion angles with an accompanying natural gradation.

It is still another object of the present invention to provide a bi-level phase grating type reticle suitable as a focusing plate for single lens reflex cameras and cinema cameras.

Another object of the present invention is to provide an improved bi-level phase grating focusing plate which has increased freedom or flexibility of design for obtaining desired diffraction characteristics which can provide naturally gradated defocused images and whose diffraction characteristics are less affected by any manufacturing errors occurring during mass production.

A still further object of the present invention is to provide an improved bi-level phase grating focusing plate which facilitates observation of a defocused image so that focusing can be easily carried out.

On a surface of a focusing plate of the present invention there are regularly arranged a number of fine unit patterns, each of which includes a plurality of cylindrical projections and/or recessions or a plurality of sets of intermittently arranged ring-shaped projections. The manner of the arrangement of the unit patterns is either regular square or regular triangular, and the cylindrical projections and/or recessions or the sets of ring-shaped concentric projections and recessions of each of the unit patterns are spaced from and symmetrical with each other. The focusing plate thus constructed makes it possible to modulate its diffraction characteristics not only in accordance with the level difference between the projections and the recessions (i.e., the phase difference $\theta$) and the combination of the radii of the cylindrical projections and/or recessions or the ring-shaped concentric projections and recessions (i.e., the ratio $\gamma$) but also in accordance with the relative configuration of the cylindrical projections and/or recessions or the sets of the ring-shaped concentric projections and recessions, thereby enhancing a freedom of design for obtaining the desired diffraction characteristics. Additionally, the relative configuration of the cylindrical projections and/or recessions or the sets of the ring-shaped concentric projections and recessions is useful to suppress accidental modulation of the diffraction characteristics which might occur due to a production error in the length of the radii of the cylindrical projections and/or recessions or in the combination of radii of the ring-shaped concentric projections and recessions.

Preferably, according to the present invention, the level difference between the projections or recessions and the surface of the focusing plate is set to give rise to a phase difference $\theta$ of $\pi$ radians for a light having a wavelength ranging from approximately 0.46 $\mu$m to 0.64 $\mu$m in accordance with:

$$\cos \theta \leq 1 - \frac{1}{4\gamma(1-\gamma)}$$

The ratio $\gamma$ of the sum of the areas of the projections or the recessions to the overall area of the unit pattern is set to satisfy the inequality:

$$0.25 \leq \gamma < 0.5$$

Accordingly, a focusing plate embodying the present invention by satisfying the above conditions permits a considerable amount of light to be centered within a relatively wide range of diffusion angles, thereby permitting a bright visual field. For all wavelengths of light within the range, the intensity of "0,0"th diffraction light occupies less than 50% of that of total diffraction light, permitting easy focusing. Since the unit patterns are arranged in a two-dimensional manner, diffusion of light is not biased in a specific direction, thus facilitating focusing of any desired object. In addition, the focusing plate has a substantially perpendicular surface with respect to its optical axis and provides a sharp visual field free of grain-sized black points.

In a preferred embodiment of the present invention, the focusing plate comprises a transparent plate of the transmission type. It is, however, obvious to those skilled in the art that the present invention is also applicable to the reflective type of a bi-level phase grating type focusing plate wherein light is reflected from a unit pattern bearing surface.

The above and other objects and features of the present invention will become more apparent from the following description taken in connection with the accompany accompanying drawings.

BRIEF DESCRIPTION OF THE DRAWINGS

FIGS. 13 and 14 are diagrams of diffraction characteristics of the unit pattern shown in FIG. 5, i.e., defocused images of a point light source formed through the focusing plate having the unit patterns shown in FIG. 5, wherein FIG. 13 shows the case where the radii of the projections are correctly given and FIG. 14 shows the case where the radii of the projections are erroneously manufactured with a 10% variance of the pitch d of the unit pattern;

FIGS. 16 and 17 are diagrams of diffraction characteristics of the unit pattern shown in FIG. 15, i.e., defocused images of a point light source formed through the prior art focusing plate having the unit patterns shown in FIG. 15, wherein FIG. 16 shows the case where the radii of the projections and recessions are correctly given and FIG. 17 shows the case where the radii of the projections and recessions are erroneously provided with a variance of 1.5% of the pitch d of the unit pattern.

DESCRIPTION OF THE PREFERRED EMBODIMENTS

The following description is provided to enable any person skilled in the optical art to make and use the invention and sets forth the best modes contemplated by the inventors for carrying out their invention. Various modifications, however, will remain readily apparent to those skilled in the art, since the generic principles of the present invention have been defined herein specifically to provide a bi-level phase grating focusing plate that can be manufactured in a relatively economical manner.

Figure 1:
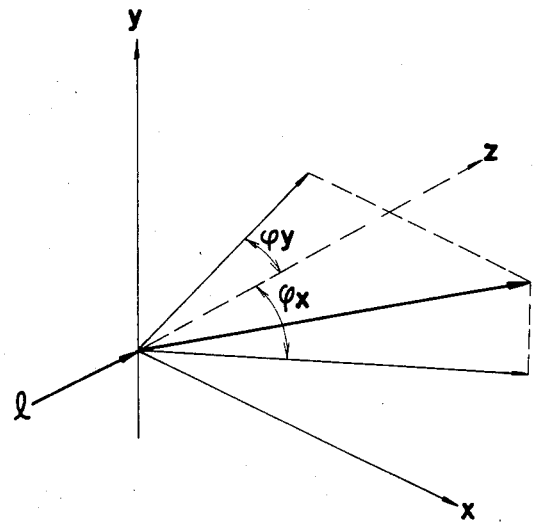
FIG. 1 is a schematic illustration of the diffraction of light.

Before describing the preferred embodiments, an analysis of the contributions of different elements of a focusing plate is provided to facilitate an understanding of the principles of the present invention. Assuming that x y coordinates are taken along a surface of a phase grating formed with fine unit patterns consisting of projections and recessions and that the x direction diffraction angle and the y direction diffraction angle of the light diffracted by the phase grating are $\phi x$ and $\phi y$, respectively, as shown in FIG. 1, $\phi x$ and $\phi y$ can be correlated with spatial frequencies fx and fy, respectively, as below.

$$fx = \sin \phi x/\lambda \quad fy = \sin \phi y/\lambda \quad (1)$$

wherein $\lambda$ represents the wavelength of the light 1 incident on the phase grating. When it is further assumed that the phase grating can be formulated by the function P(x,y) which equals to 1 at projections and 0 at recessions, the intensity of the "O,O" diffraction light is given by the equation:

$$I(O,O) = |1 + \gamma(\exp[j\theta] - 1)|^2 \quad (2)$$

wherein $\theta$ represents the phase difference of the light due to the level difference between the projections and recessions and $\gamma$ represents the ratio of a summation of the areas of the individual projections of a single unit pattern to the overall area of the unit pattern.

In contrast, the intensity of a high degree diffraction light is given by the equation:

$$I(fx,fy) = |(\exp[j\theta] - 1) \int \int P(x,y) \exp[-2\pi j](fx.x + fy.y)dx.dy|^2 \quad (3)$$

The integration section in equation (3) is across the range of one unit pattern.

As can be understood from equation (2), the intensity of the "O,O" diffraction light depends on $\theta$ and $\gamma$. In contrast, as can be understood from equation (3), the intensity of greater diffraction light chiefly depends on P(x.y), i.e., the configuration of the phase grating itself while it also depends on $\theta$.

A prior art focusing plate with unit patterns having one cylindrical projection regularly arranged in a regular square configuration could be mistakenly interpreted as having $n^2$ unit patterns constitute a unit pattern according to the present invention (where n is an integral not less than 2). However, such observation is erroneous since the diffraction characteristic is determined based on the minimum pitch of the repeated unit patterns. Thus, a unit pattern according to the present invention implies a pattern corresponding to the minimum pitch.

The size of each unit pattern should be smaller than the resolving power of the human eye when magnified through a camera eyepiece. Namely, the maximum permissible size of each unit pattern should be approximately 30 μm with a single lens reflex camera for still pictures and ten to several μm with a cinecamera.

Description is hereby given to the specific embodiments of the present invention.

Figure 2:
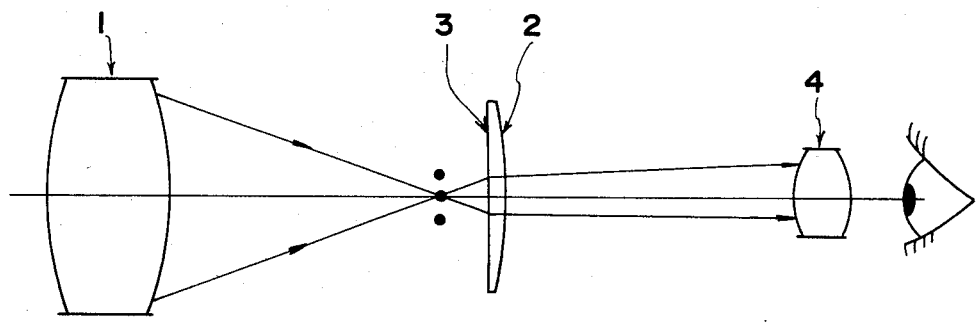
FIG. 2 is an exploded schematic diagram of a viewfinder optical system for a camera using a focusing plate according to the present invention.

Referring to FIG. 2, there is illustrated, in an exploded schematic diagram, a viewfinder optical system of a camera which includes a camera lens 1 behaving as part of a focusing optical system, a focusing plate 2 coupled with a condenser lens 3 and an eyepiece 4.

Figure 3:
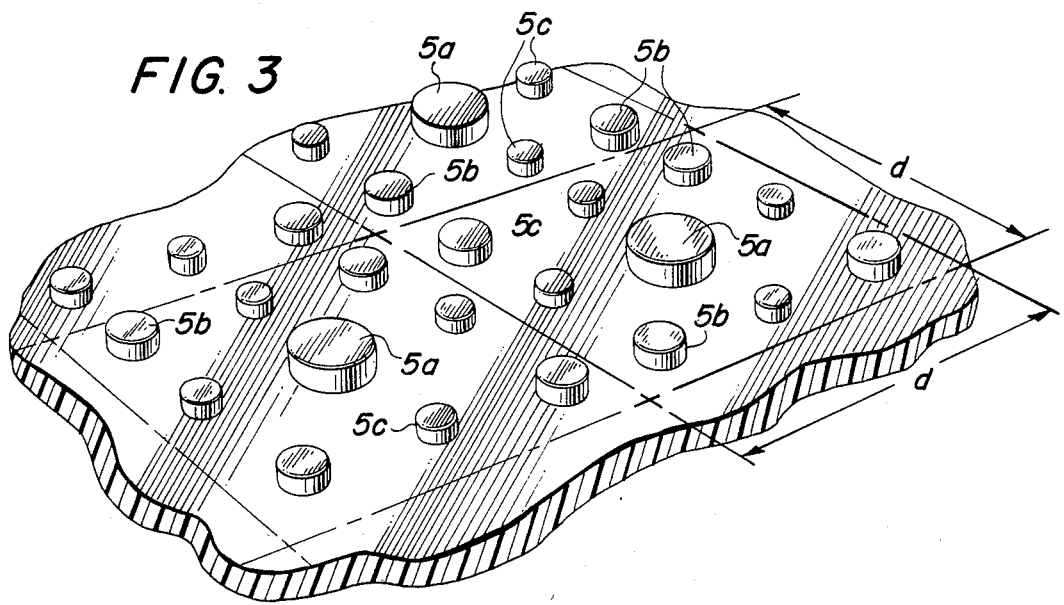
FIGS. 3 to 6 are enlarged plan views of various unit patterns formed on focusing plates of the present invention.
Figure 4:
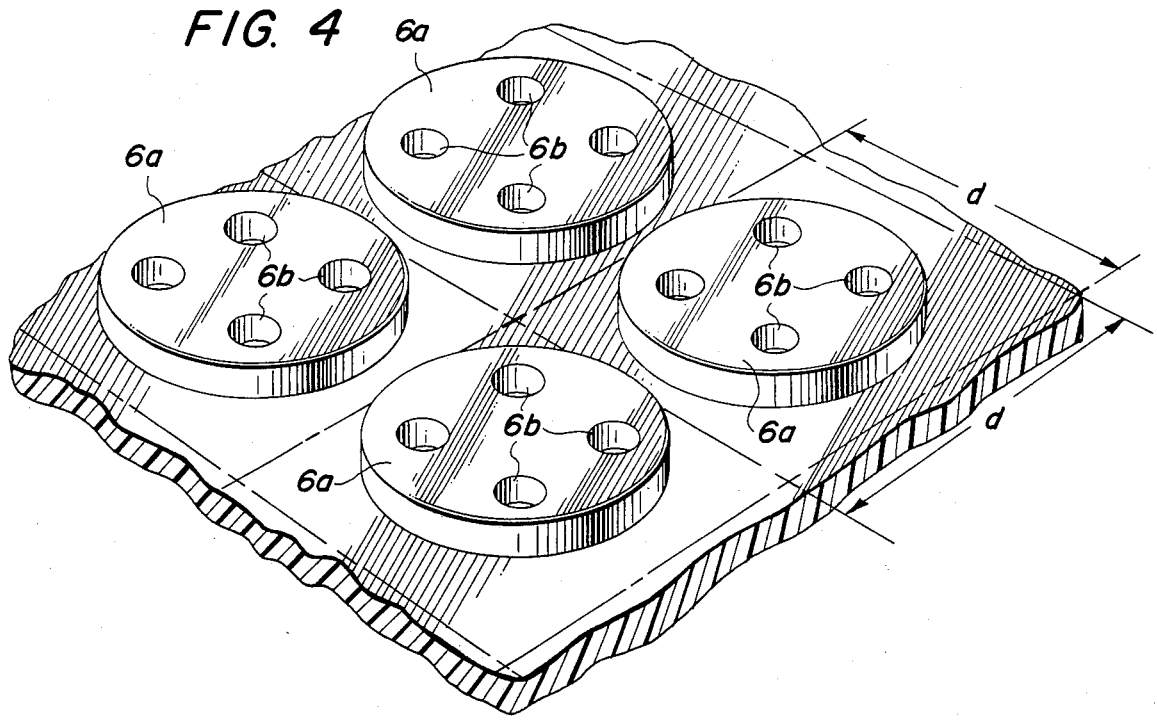

FIGS. 3 and 4 illustrate a pair of unit patterns, each of which is capable of forming a focusing plate of the present invention when repeatedly arranged in a regular square configuration. Focusing plates formed with these unit patterns can provide defocused images having four symmetric axes.

The unit pattern shown in FIG. 3 is a regular square and formed with one cylindrical projection 5a at its center, four cylindrical projections 5b along its diagonal lines, and four cylindrical projections 5c at the middle points between each pair of projections 5b. The top surfaces of these projections 5a, 5b and 5c are flat and flush with each other. The remaining area of the unit pattern can be considered as a recession. By normalizing pitch d of the unit pattern to 1, the coordinates of the centers of the projections and the radii of the projections are given as follows:

|    | Coordinates    | Radii |
|----|----------------|-------|
| 5a | (0, 0)         | 0.21  |
| 5b | (0.28, 0.28)   | 0.133 |
|    | (−0.28, 0.28)  | 0.133 |
|    | (−0.28, −0.28) | 0.133 |
|    | (0.28, −0.28)  | 0.133 |
| 5c | (0, 0.333)     | 0.05  |
|    | (0, −0.333)    | 0.05  |
|    | (0.333, 0)     | 0.05  |
|    | (−0.333, 0)    | 0.05  |

Thus, the ratio $\gamma$ of the area of overall projections 5a, 5b and 5c to the overall area of the unit pattern becomes 0.393.

Figure 7:
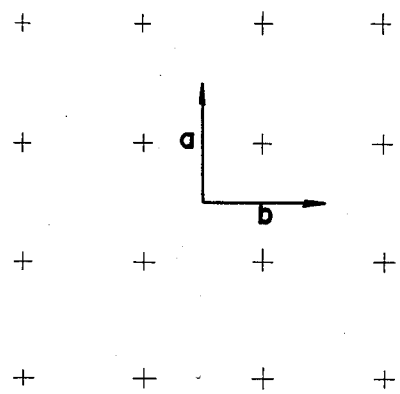
FIGS. 7 and 8 are explanatory illustrations of basic grating vectors for regular square configuration of the unit patterns and for regular triangular configuration of the unit patterns, respectively.

Referring to FIG. 7, there are illustrated two basic grating vectors a and b which align with the interconnecting lines between the centers of the adjacent unit patterns repeatedly arranged in a regular square configuration. The configuration of projections 5a, 5b and 5c is symmetrical with respect to the center point of the unit pattern and has a pair of symmetric axes aligning with basic grating vectors a and b and another pair of symmetric axes and aligning with the diagonal lines of the unit pattern.

On the other hand, the unit pattern shown in FIG. 4 is formed with one cylindrical projection 6a at its center and four cylindrical recessions 6b on projection 6a. The bottom surfaces of these recessions are flush with the outside remaining area of the unit pattern which is also considered to be a recession. By normalizing pitch d of the unit pattern to 1, the coordinates of the centers of projection 6a and recession 6b and the radii of projection 6a and recessions 6b are given as below:

|    | Coordinate  | Radii |
|----|-------------|-------|
| 6a | (0, 0)      | 0.417 |
| 6b | (0.25, 0)   | 0.1   |
|    | (0, 0.25)   | 0.1   |
|    | (−0.25, 0)  | 0.1   |
|    | (0, −0.25)  | 0.1   |

Thus, the ratio $\gamma$ of the area of projection 6a (subtracted by the areas of recessions 6b) to the overall area of the unit pattern becomes 0.421. The configuration of projection 6a and recessions 6b is symmetrical with respect to the center point of the unit pattern and has a pair of symmetric axes aligning with basic grating vectors a and b and another pair of symmetric axes and aligning with the diagonal lines of the unit pattern, as is common to the unit pattern shown in FIG. 3.

The focusing plate, having the unit patterns shown in either FIG. 3 or FIG. 4, is made of a transparent acrylic resin plate of a refracting power n=1.49 and the level difference h between the projection(s) and the recession(s) is set to be 0.54 μm so that it provides a phase difference $\theta = \pi$ for light having a wavelength $\gamma 0.53$ μm. It is to be noted that these conditions are commonly incorporated in each example hereinafter described.

Figure 5:
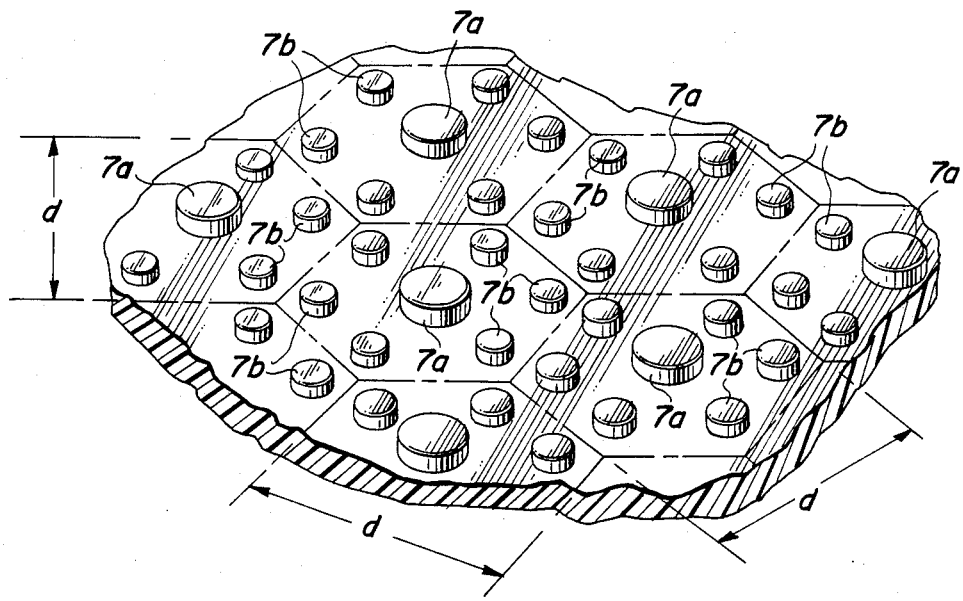
Figure 6:
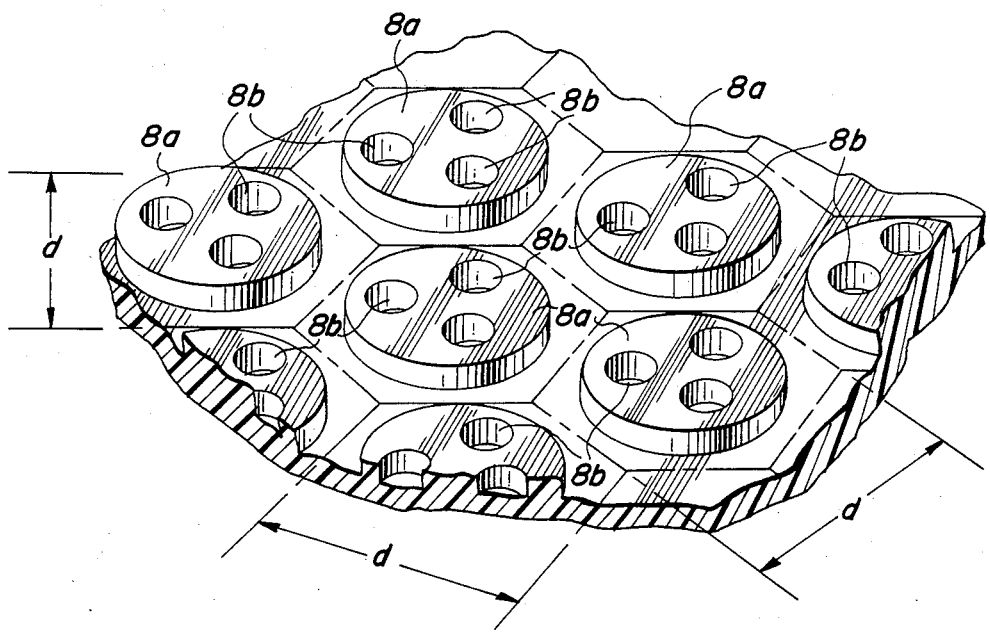

FIGS. 5 and 6 illustrate a pair of unit patterns, each of which is capable of forming a focusing plate of the present invention when repeatedly arranged in a regular triangular configuration. A focusing plate having the unit pattern shown in FIG. 5 can provide defocused images having six symmetric axes whereas a focusing plate having the unit pattern shown in FIG. 6 can provide defocused images having three symmetric axes.

The unit pattern shown in FIG. 5 is hexagonal and formed with one cylindrical projection 7a at its center and six cylindrical projections 7b along its diagonal lines. By normalizing pitch d of the unit pattern to 1, the coordinates of the centers of projections 7a and 7b and the radii of the projections are given as below:

|  | Coordinates | Radii |
|---|---|---|
| 7a | (0, 0) | 0.2 |
| 7b | (0.4 cos 30°, 0.2) | 0.12 |
|  | (0, 0.4) | 0.12 |
|  | (−0.4 cos 30°, 0.2) | 0.12 |
|  | (−0.4 cos 30°, −0.2) | 0.12 |
|  | (0, −0.4) | 0.12 |
|  | (0.4 cos 30°, −0.2) | 0.12 |

Thus, the ratio $\gamma$ of the overall area of projections 7a and 7b to the overall area of the unit pattern becomes 0.458.

Figure 8:
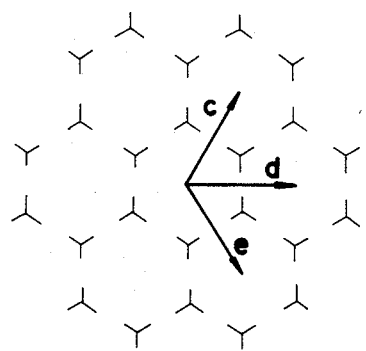

Referring to FIG. 8, there are shown two basic grating vectors c and d and a vector e obtained by combining the basic grating vectors c and d (i.e., −c+d). The basic grating vectors c and d and the vector e align with the interconnecting lines between the centers of the adjacent unit patterns repeatedly arranged in a regular triangular configuration, respectively. The unit pattern shown in FIG. 5 has three symmetric axes aligning with basic grating vectors c and d and the vector e and three symmetric axes deflected by 30° from basic grating vectors c and d and the vector e respectively and aligning with the diagonal lines of the unit pattern.

On the other hand, the unit pattern shown in FIG. 6 is formed with one cylindrical projection 8a at its center and three recessions 8b on projection 8a. The bottom surfaces of recessions 8b are flush with the outside remaining area of the unit pattern which is also considered as a recession. By normalizing pitch d of the unit pattern to 1, the coordinates of the centers of projection 8a and recessions 8b and the radii of the projection and the recessions are given as below:

|  | Coordinates | Radii |
|---|---|---|
| 8a | (0, 0) | 0.44 |
| 8b | (0, 0.257) | 0.14 |
|  | (0, 233, −0.128) | 0.14 |
|  | (−0.223, −0.128) | 0.14 |

Thus, the ratio $\gamma$ of the area of projection 8a (substrated by the areas of recessions 8b) to the overall area of the unit pattern becomes 0.489. The unit pattern has a set of three symmetric axes and aligning with three of the diagonal lines of the unit pattern which form an angle of 120° with one another.

Figure 9:
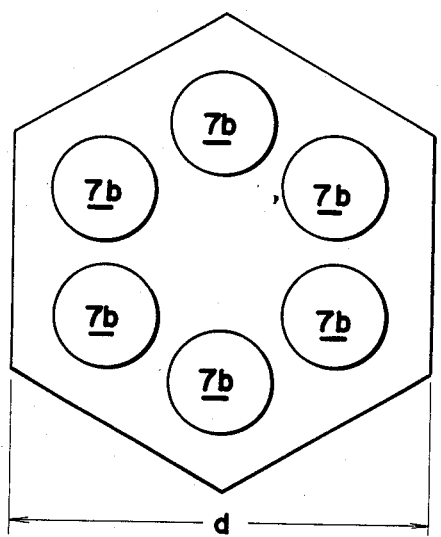
FIGS. 9 and 10 are enlarged plan views of further examples of the unit patterns formed on focusing plates of the present invention.

FIG. 9 illustrates another example of a unit pattern modified from that shown in FIG. 5. The unit pattern shown in FIG. 9 differs from that shown in FIG. 5 in that it is not formed with central projection 7a and in that projection 7b is nearer to the center of the unit pattern. By normalizing pitch d of the unit pattern to 1, the coordinates of the centers of projections 7b and the radii of the projections are given as below:

|  | Coordinates | Radii |
|---|---|---|
| 7b | (0.3 cos 30°, 0.15) | 0.12 |
|  | (0, 0.3) | 0.12 |
|  | (−0.3 cos 30°, 0.15) | 0.12 |
|  | (−0.3 cos 30°, −0.15) | 0.12 |
|  | (0, −0.3) | 0.12 |
|  | (0.3 cos 30°, −0.15) | 0.12 |

Thus, the ratio $\gamma$ of the overall area of projections 7b to the overall area of the unit pattern becomes 0.325. This unit pattern has a total of six symmetric axes, as is common to those shown in FIG. 5.

Figure 10:
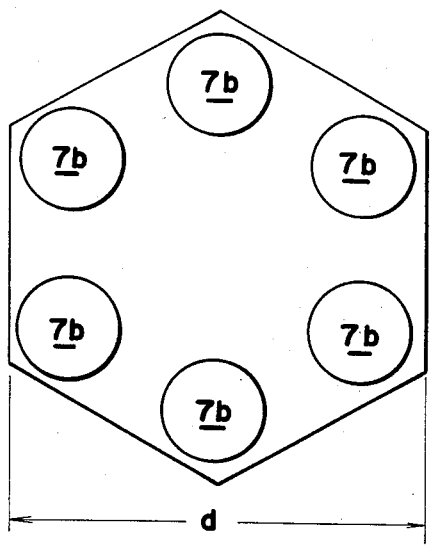

Description has been given of some examples of unit patterns capable of forming a focusing plate of the present invention. In order to demonstrate the fact that a change in the relative configuration of projections and-/or recessions of the same dimension unit pattern causes modulation of diffraction characteristics, an example of a unit pattern modified from that shown in FIG. 9 such that the positions of projections 7b are transferred radially outwardly by 10% of pitch d is shown in FIG. 10. Namely, with the unit pattern shown in FIG. 10, the ratio $\gamma$ remains unchanged as compared with the unit pattern shown in FIG. 9 but the coordinates of the centers of projections 7b are changed as follows:

|  | Coordinates | Radii |
|---|---|---|
| 7b | (0.4 cos 30°, 0.2) | 0.12 |
|  | (0, 0.4) | 0.12 |
|  | (−0.4 cos 30°, 0.2) | 0.12 |
|  | (−0.3 cos 30°, −0.2) | 0.12 |
|  | (0, −0.4) | 0.12 |
|  | (0.4 cos 30°, 0.2) | 0.12 |

Figure 11:
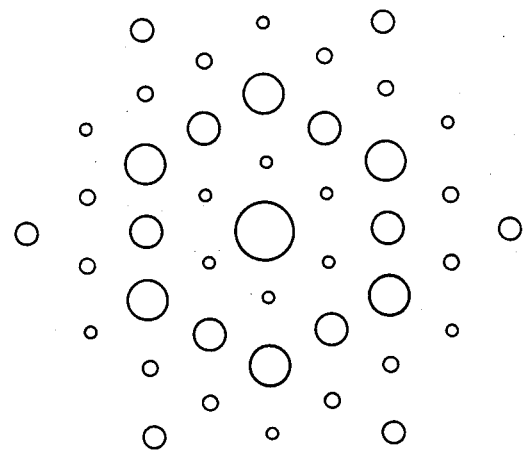
FIGS. 11 and 12 are diagrams of diffraction characteristics of the unit patterns shown in FIGS. 9 and 10, i.e., defocused images of a point light source formed through the focusing plate having the unit patterns shown in FIG. 9 and also through that having the unit patterns shown in FIG. 10, respectively.
Figure 12:
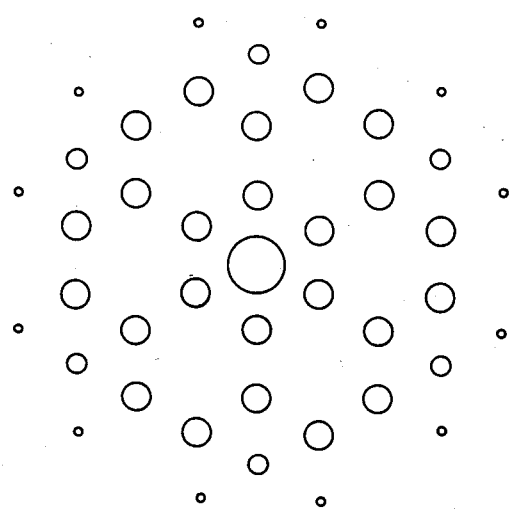

Diffraction characteristics of the unit patterns shown in FIGS. 9 and 10 are illustrated in FIGS. 11 and 12, respectively, in which the circles represent the distribution of various dimension diffraction lights and the sizes of the circles correspond to the intensities of the respective diffraction lights. Comparison of these figures reveals that the weight of the diffraction of the light (i.e., the distribution of the intense diffraction lights) is near the center in FIG. 11 while it is distant from the center in FIG. 12. In this manner, it is possible to modulate diffraction characteristics by changing the distance between the center and projections and/or recessions of a unit pattern with the ratio $\gamma$ and the phase difference $\theta$ unchanged. In other words, freedom of design for determining diffraction characteristics of a bi-level phase grating focusing plate is increased. This design option is not provided in prior art focusing plates with unit patterns having only one cylindrical projection or recession at their center.

Figure 13:
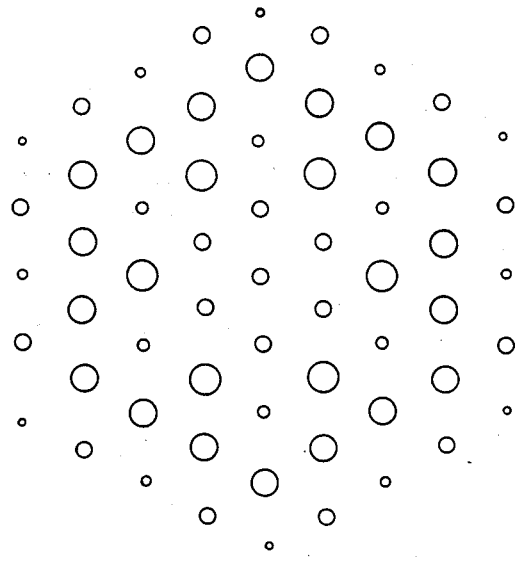
Figure 14:
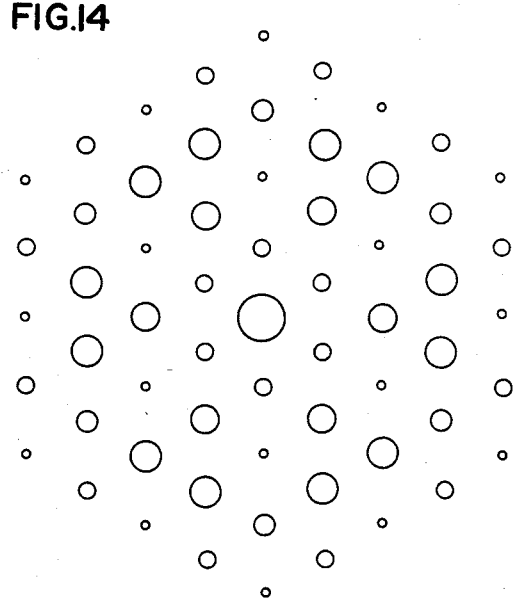

FIG. 13 illustrates the diffraction characteristics of the unit pattern shown in FIG. 5 while FIG. 14 illustrates the diffraction characteristics of the same unit pattern that is, however, erroneously produced such that the radii of projections 7a and 7b are decreased by 1.5% of pitch d. Comparison of these Figures reveals that no significant change occurs in the intensities of the diffraction light other than the "0,0"th diffraction light. The reason for this is that the diffraction characteristics depend greater on the distances between the center of the unit pattern and projections 7a and 7b than it depends on the radii of projections 7a and 7b, i.e., the ratio $\gamma$. It should be understood that it is difficult to form projections and/or recessions with a precise and exact radii under actual production or manufacturing conditions. However, according to the focusing plate of the present invention, modulation of the diffraction characteristics due to any error in the radii of projections and/or recessions can be suppressed by the configuration of the projections and/or recessions, so that production or manufacturing thereof is facilitated.

Figure 15:
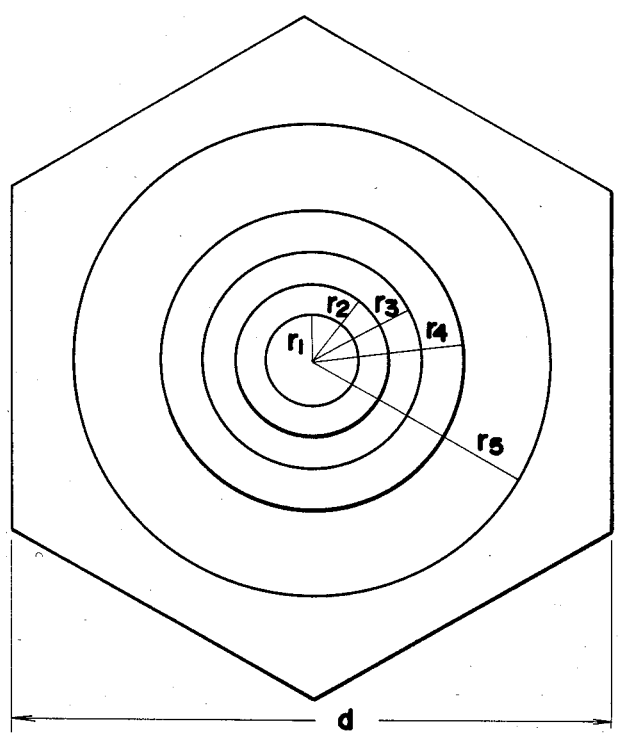
FIG. 15 is an enlarged view of a unit pattern formed on a prior art focusing plate.
Figure 16:
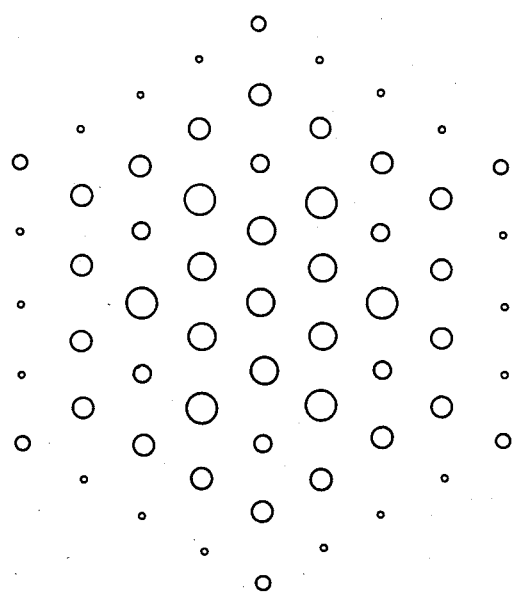
Figure 17:
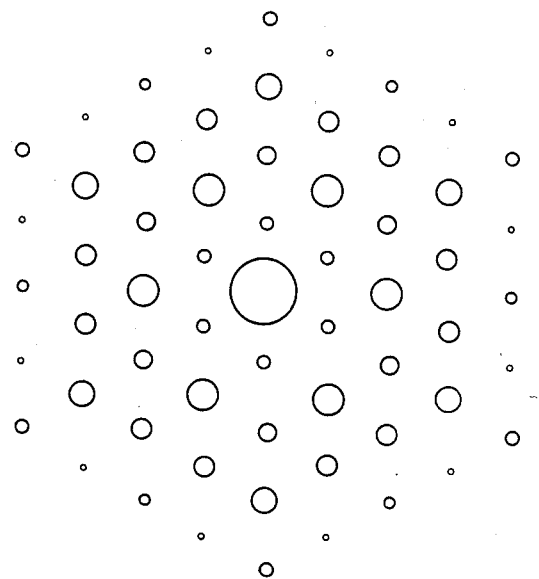

FIGS. 15 to 17 are presented to provide a comparison of a prior art focusing plate. More particularly, FIG. 15 illustrates a unit pattern of a prior art focusing plate having one set of alternatively arranged concentric ring-shaped projections and recessions about its center. When the radii of the projections and recessions are represented by $r_1$, $r_2$, $r_3$, $r_4$ and $r_5$ as shown, then $r_1$, $r_2$, $r_3$, $r_4$, and $r_5$ are given as follows by normalizing pitch d to 1:

$r_1 = 0.075$, $r_2 = 0.125$, $r_3 = 0.175$, $r_4 = 0.25$, $r_5 = 0.4$

It should be understood that the area inside $r_1$, between $r_2$ and $r_3$ and between $r_4$ and $r_5$ are projectons while the area between $r_1$ and $r_2$ and that between $r_3$ and $r_4$ are recessions.

FIG. 16 illustrates the diffraction characteristics of the unit pattern shown in FIG. 15 while FIG. 17 illustrates the diffraction characteristics of the same unit pattern if it is erroneously produced such that the projections are radially inwardly and outwardly deviated by 1.5% of pitch d, i.e., $\gamma_1$, $\gamma_3$ and $\gamma_5$ are decreased by 1.5% of d while $\gamma_2$ and $\gamma_4$ are increased by 1.5% of d. Comparison of these Figures reveals that the intensities of the higher order or greater dimension (including the first) diffraction light are subjected to considerable change, resulting in considerable modulation of the diffraction characteristics. The reason for this is that the diffraction characteristics heavily depend on the ratio $\gamma$, i.e., the combination of the radii of the ring-shaped concentric projections and recessions. Thus, it becomes difficult to produce focusing plates having the unit patterns.

Although the above examples of unit patterns of the present invention have a plurality of cylindrical projections and/or recessions, it is possible to have a focusing plate of the present invention formed with unit patterns, each of which has a plurality of sets of the ring-shaped concentric projections and recessions as shown in FIG. 15. More particularly, it is possible, for example, to substitute a plurality of sets of the ring-shaped concentric projections and recessions as shown in FIG. 15 for projections 5a, 5b and 5c in FIG. 3 or for projections 7a and 7b in FIG. 5.

Figure 18:
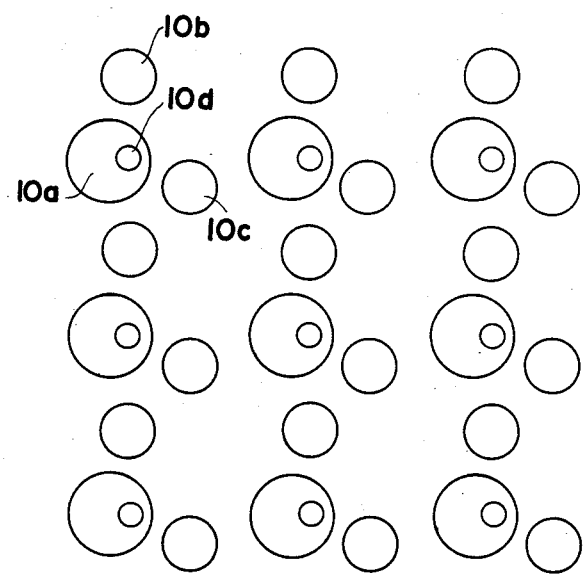
FIG. 18 is an enlarged view of a focusing plate of the present invention.

FIG. 18 illustrates a focusing plate formed with unit patterns which are regularly arranged in a regular square configuration and each of which has no symmetric axes. Each unit pattern shown in FIG. 18 is formed with projections 10a, 10b and 10c and a recession 10d. The diffraction characteristics of the unit pattern is provided with only one symmetric axis, and, therefore, naturally gradated defocused images cannot be obtained. In contrast thereto, the diffraction characteristics of the unit patterns shown in FIGS. 3 and 4 have four symmetric axes, and the diffraction characteristics of the unit patterns shown in FIGS. 6 and 9 have six symmetric axes and the diffraction characteristics of the unit pattern shown in FIG. 5 has three symmetric axes, thereby providing naturally gradated defocused images.

Preferably, in focusing plates of the present invention particularly suited for practical use, the ratio $\gamma$ of a unit pattern should satisfy the inequality $0.25 \leq \gamma < 0.5$, and the phase difference $\theta$ should be $\pi$ radians for a light having a desired wavelength within the range from 0.46 $\mu$m to 0.64 $\mu$m. That is, in order to facilitate focusing, the ratio Io of the intensity of "O"th dimension diffraction light to the total intensities of the entire diffraction light should preferably be less than 50%. Io can be represented by:

$$Io = 1 + 2\gamma(1-\gamma)(\cos\theta - 1) \qquad (4)$$

When equation (4) is substituted by Io < 0.5, the following inequality can be obtained:

$$\cos\theta \leq 1 - \frac{1}{4\gamma(1-\gamma)} \qquad (5)$$

Inequality (5) indicates the conditions of the ratio $\gamma$ and the phase difference $\theta$ for practically facilitating focusing and $0.25 \leq \gamma < 0.5$ and $\theta = \pi$ radians satisfy this inequality for all light having a wavelength ranging from 0.46 $\mu$m to 0.64 $\mu$m. For example, giving $0.25 \leq \gamma < 0.5$ to inequality (5) in the case of $\theta = \pi$ radians for a light having a wavelength $\gamma = 0.46$ $\mu$m results in:

$$0\% < I_{o\gamma} = 0.46 \ \mu m < 25\%$$

In this case, $\theta$ becomes $0.69\pi$ radians for a light having a wavelength $\lambda = 0.64$ $\mu$m and giving $0.25 \leq \gamma < 0.5$ to inequality (5) results in:

$$22\% < I_{o\gamma} = 0.64 \ \mu m < 41\%$$

On the other hand, giving $0.25 \leq \gamma < 0.5$ to inequality (5) in the case of $\theta = \pi$ radians for a light having a wavelength $\lambda = 0.64$ $\mu$m results in:

$$0\% < I_{o\gamma} = 0.64 \ \mu m < 25\%$$

In this case, $\theta$ becomes $1.39\pi$ radians for a light having a wavelength $\lambda = 0.46$ $\mu$m and giving $0.25 \leq \gamma < 0.5$ to inequality (5) results in:

$$33\% < I_{o\gamma} = 0.46 \ \mu m < 49.8\%$$

In the above-described preferred embodiments of the present invention, the focusing plate comprises a transparent plate of the transmission type. It is, however, obvious to those skilled in the art that the present invention is also applicable to the reflective type of a bi-level phase grating type focusing plate wherein light is reflected from a unit pattern bearing surface.

While the above embodiments have been disclosed as the best modes presently contemplated by the inventors, it should be realized that these examples should not be interpreted as limiting, because artisans skilled in this field, once given the present teachings, can vary from these specific embodiments.

Accordingly, the scope of the present invention should be determined solely from the following claims, in which I claim:

1. A bi-level phase grating focusing plate for use in a camera viewfinder, comprising a substrate having a first surface and a number of unit patterns which are repeatedly and adjacently arranged on said first surface of said substrate so as to be sectioned from each other by imaginary boundaries therebetween in such a manner as to be defined by a minimum repetition pitch of the repeated arrangement thereof, respectively, wherein each of said unit patterns includes a plurality of means for creating a level difference for diffraction of light, each of which has a second surface which is parallel with and different in level from said first surface of said substrate such that each of said unit patterns causes diffraction of light due to the level difference between said first and second surfaces, the minimum repetition pitch defining the smallest division of the focusing plate that can repeat the plurality of means for creating a level difference in a pattern of repetitive juxtaposition to each other on the focusing plate, and wherein said plurality of means of each said unit pattern is arranged within the minimum repetition pitch in an identical manner with those in the other unit patters and spaced nonconcentrically from each other, with the centers of said plurality of means being at different positions, respectively, to provide a symmetrical configuration.

2. A bi-level phase grating focusing plate as defined in claim 1, wherein the ratio $\gamma$, which is the sum of the areas of said second level surfaces of said plurality of means divided by the overall areas of said unit patterns, satisfies the inequality of $0.25 \leq \gamma < 0.5$ and the phase difference $\phi$ of the light due to the level difference between said first and second surfaces is approximately $\pi$ radians for light having a desired wavelength ranging from 0.45 $\mu$m to 0.64 $\mu$m.

3. A bi-level phase grating focusing plate as defined in claim 2, wherein said unit pattern are arranged in a quadrate configuration and each of said unit patterns in a quadrate.

4. A bi-level phase grating focusing plate as defined in claim 1, wherein said unit patterns are arranged in an equilateral triangular configuration and each of said unit patterns is an equilateral hexagon.

5. A bi-level phase grating focusing plate as defined in claim 1, wherein each of said plurality of means has a circular cross section in a plane parallel to said first and second level surfaces.

6. A bi-level phase grating focusing plate as defined in claim 1, wherein said substrate and said plurality of means are light transmissive.

7. A bi-level phase grating focusing plate as defined in claim 1, wherein said first and second surfaces are light reflective.

8. A bi-level phase grating focusing plate for use in a camera viewfinder, having on a surface thereof, a number of unit patterns repeatedly and adjacently arranged so as to be sectioned from each other by imaginary boundaries therebetween and so as to be defined by a minimum repetition pitch of the repeated arrangement thereof, respectively, wherein each of said unit patterns includes a first region with a first level surface which is co-planar with said surface of said focusing plate and a second region with a second level surface which is parallel with and different in level from said first level surface such that each of said unit patterns causes diffraction of light due to the level difference between the first and second level surfaces, the minimum repetition pitch defining the smallest division of the focusing plate that can repeat the first and second regions in a pattern of repetitive juxtaposition to each other on the focusing plate, each of said unit patterns being indivisible into more minute unit patterns having a repeated arrangement, wherein one of said first and second regions in each of said unit patterns has a plurality of portions which are spaced nonconcentrically from each other with the centers of said plurality of portions being at different positions, respectively, to provide a symmetrical configuration; and wherein the arrangement of said plurality of portions in each said unit patterns is identical.

9. A bi-level phase grating focusing plate as defined in claim 8, wherein said first region includes said plurality of portions spaced nonconcentrically from each other to provide the symmetrical configuration.

10. A bi-level phase grating focusing plate as defined in claim 9, wherein said second region includes a portion centered at the center of said unit pattern and said plurality of portions of said first region are arranged on said portion of said second region so as to be centered at other than the center of the unit pattern.

11. A bi-level phase grating focusing plate as defined in claim 10, wherein said unit patterns are arranged in an equilateral triangular configuration and each of said unit patterns is an equilateral hexagon.

12. A bi-level phase grating focusing plate as defined in claim 8, wherein said second region includes said plurality of portions nonconcentrically spaced from each other to provide the symmetrical configuration.

13. A bi-level phase grating focusing plate as defined in claim 12, wherein one of said plurality portions of said second region is centered at the center of said unit pattern while the others are centered at other than the center of said unit pattern.

14. A bi-level phase grating focusing plate as defined in claim 13, wherein all of said plurality of portions of said second region are circular in a plan view.

15. A bi-level phase grating focusing plate as defined in claim 12, wherein all of said plurality of portions of said second region are centered at other than the center of said unit pattern.

16. A bi-level phase grating focusing plate as defined in claim 15, wherein all of said plurality of portions of said second region are circular in a plan view.

17. A bi-level phase grating focusing plate as defined in claim 12, wherein said unit patterns are arranged in a quadrate configuration and each of said unit patterns in a quadrate.

18. A bi-level phase grating focusing plate as defined in claim 12, wherein said unit patterns are arranged in an equilateral triangular configuration and each of said unit patterns is an equilateral hexagon.

19. A bi-level phase grating focusing plate as defined in claim 8, wherein the ration $\gamma$, which is the sum of the area of said plurality of portions divided by the overall areas of said unit pattern, satisfies the inequality $0.25 \leq \gamma < 0.5$ and the phase difference $\phi$ of the light due to the level difference between said first and second surfaces approximately is $\pi$ radians for light having a desired wavelength ranging from 0.46 $\mu$m to 0.46 $\mu$m.

* * * * *